US012305832B2

(12) United States Patent
Beliveau

(10) Patent No.: US 12,305,832 B2
(45) Date of Patent: May 20, 2025

(54) PAINT ROLLER POLE ATTACHABLE LIGHT DEVICE

(71) Applicant: Charles Beliveau, Westborough, MA (US)

(72) Inventor: Charles Beliveau, Westborough, MA (US)

( * ) Notice: Subject to any disclaimer, the term of this patent is extended or adjusted under 35 U.S.C. 154(b) by 0 days.

(21) Appl. No.: 18/737,661

(22) Filed: Jun. 7, 2024

(65) Prior Publication Data

US 2024/0410555 A1 Dec. 12, 2024

Related U.S. Application Data

(60) Provisional application No. 63/471,880, filed on Jun. 8, 2023.

(51) Int. Cl.

| | |
|---|---|
| ***F21V 21/08*** | (2006.01) |
| ***B05C 17/02*** | (2006.01) |
| ***F21V 15/00*** | (2015.01) |
| ***F21V 21/26*** | (2006.01) |
| ***F21V 21/30*** | (2006.01) |
| ***F21V 23/04*** | (2006.01) |
| ***F21V 23/06*** | (2006.01) |
| ***F21V 33/00*** | (2006.01) |
| *F21Y 113/00* | (2016.01) |
| *F21Y 115/10* | (2016.01) |

(52) U.S. Cl.

CPC ...... *F21V 21/0816* (2013.01); *B05C 17/0222* (2013.01); *B05C 17/0245* (2013.01); *F21V 15/00* (2013.01); *F21V 21/26* (2013.01); *F21V 21/30* (2013.01); *F21V 23/04* (2013.01); *F21V 23/06* (2013.01); *F21V 33/0084* (2013.01); *F21Y 2113/00* (2013.01); *F21Y 2115/10* (2016.08)

(58) Field of Classification Search

CPC ...... F21V 21/0816; F21V 15/00; F21V 21/26; F21V 21/30; F21V 23/04; F21V 23/06; F21V 33/0084; B05C 17/0222; B05C 17/0245; B05C 17/0205; F21Y 2113/00; F21Y 2115/10

See application file for complete search history.

(56) References Cited

U.S. PATENT DOCUMENTS

| | | | | |
|---|---|---|---|---|
| 2015/0251210 A1* | 9/2015 | Surratt | .................... | B25G 3/36 15/105 |
| 2020/0032968 A1* | 1/2020 | Holden | .................. | F21V 23/04 |
| 2022/0082247 A1* | 3/2022 | Jacobson | ............. | F21V 23/005 |

* cited by examiner

*Primary Examiner* — Donald L Raleigh

(74) *Attorney, Agent, or Firm* — Brennan, Manna & Diamond, LLC

(57) ABSTRACT

A paint roller pole light device is disclosed that comprises a repositionable light component that is removably attached via straps to a paint roller pole. Specifically, the repositionable light component is attached to a repositionable arm via an omni-directional mount. In this manner, the device illuminates the area directly in front of the paint roller during use. Further, the device is available in a kit comprising two repositionable lights, one for use and one to be charged, with straps to hold the light, and a charger.

17 Claims, 12 Drawing Sheets

100
102
104
108
200
202
204
206
212
214
218
222
228
300
302
304
306
308
310
312
1000
1002
1004

PAINT ROLLER POLE ATTACHABLE LIGHT DEVICE

CROSS-REFERENCE TO RELATED APPLICATION

The present application claims priority to, and the benefit of, U.S. Provisional Application No. 63/471,880, which was filed on Jun. 8, 2023, and is incorporated herein by reference in its entirety.

FIELD OF THE INVENTION

The present invention relates generally to the field of paint roller pole light devices. More specifically, the present invention relates to a painting light device that can be removably attached to a paint roller. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in paint roller pole light devices. Generally, while painting indoors, it is critical that the painting area is adequately illuminated. However, this may be difficult as the lighting of a room may not adequately illuminate the specific area an individual is painting. As a result, a user must employ a second individual to shine a secondary light upon said painting area.

Typically, a roller brush connected with an extension rod allows a user to paint a high part of a wall surface or a ceiling easily. However, when the existing paint roller is used, the light source can be insufficient, so that the painting is uneven, requiring later reworking. Thus, the lighting in a room is typically inadequate when a user is painting.

Accordingly, there is a demand for an improved paint roller pole light device that adequately illuminates walls and/or ceilings for users to paint with ease. More particularly, there is a demand for a paint roller pole light device that illuminates a painting area without the need for a second individual.

Therefore, there exists a long felt need in the art for a paint roller pole light device that provides users with a painting and lighting device. There is also a long felt need in the art for a paint roller pole light device that can be removably attached to a paint roller. Further, there is a long felt need in the art for a paint roller pole light device that illuminates a painting area of the roller without the need for a second individual. Moreover, there is a long felt need in the art for a device that comprises a repositionable light. Further, there is a long felt need in the art for a paint roller pole light device that is repositionable via an omni-directional mount. Finally, there is a long felt need in the art for a paint roller pole light device that is available as a kit.

The subject matter disclosed and claimed herein, in one embodiment thereof, comprises a paint roller pole light device. The device is a paint roller pole with attachable light device. The paint roller pole light device comprises a repositionable light component that is removably attached via straps to a paint roller pole. Specifically, the repositionable light component is attached to a repositionable arm via an omni-directional mount. In this manner, the device illuminates the area directly in front of the paint roller during use. Further, the device is available in a kit comprising two repositionable lights, one for use and one to be charged, with straps to hold the light, and a charger.

In this manner, the paint roller pole light device of the present invention accomplishes all of the forgoing objectives and provides users with a device that illuminates a painting area. The device is a repositionable light component that removably attaches to a paint roller pole. The device can be available in a kit.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a paint roller pole light device. The device is a paint roller pole with attachable light device. The paint roller pole light device comprises a repositionable light component that is removably attached via straps to a paint roller pole. Specifically, the repositionable light component is attached to a repositionable arm or neck component via an omni-directional mount. In this manner, the device illuminates the area directly in front of the paint roller during use.

In one embodiment, the paint roller pole light device is an LED attachment for paint roller extension poles, designed to make it easier to paint walls and ceilings. For example, painting the corners and edges of a room is a tough job to do right, with visibility as one of the most difficult challenges to overcome. Thus, the paint roller pole light device provides a bright LED light that can be swiveled in multiple directions, and securely strapped to a painter's pole. Thus, the device illuminates dark corners and distant surfaces, offering a faster, easier, and neater way to precision paint in any direction.

In one embodiment, the paint roller pole light device is a repositionable light component secured to a paint roller pole. Specifically, the light component can be secured to any size paint roller pole. The paint roller pole comprises a roller holding rod or pole, a paint roller secured at the upper end of the roller holding rod, and a handle component secured at the lower end of the roller holding rod. The handle component can be any suitable shape and size as is known in the art and can comprise a gripping or textured area for no-slip grip. Further, the length and diameter of the handle component may vary widely, as it is important only that it be reasonably comfortable to hold by hand and allow use of the paint roller with relative ease.

In one embodiment, the repositionable light component comprises a pivoting neck or arm component with a light head component. The pivoting neck or arm component comprises a base component with an extending neck or arm component. Further, a ratcheting pin secures the base component to the neck component and allows the neck component to pivot or ratchet up and down. Additionally, the neck component comprises a first end and a second end. The first end is secured by the ratcheting pin and the second end comprises a female version of a ball joint to secure the light head component. The multiple points and types of articulation allow a user to point the light head component wherever required, as needed.

In one embodiment, the light head component comprises a first end and a second end. The first end comprises a male version of a ball joint, which secures to the female version of the ball joint on the second end of the neck component, allowing the light head component to rotate and move on the neck component. Once in place, a tightening nut is used to secure the light head component is place. Specifically, the ball joint along with the pivoting neck component, allows the light head component to be omni-directional and allows a user to position the light head component in any position, as needed to illuminate a specific area. This helps make painting jobs faster, neater, easier, and more precise.

In one embodiment, the light head component comprises an on/off button on its body. The on/off button allows a user to turn on and off the paint roller pole light device, as needed. Further, any other suitable controls can be included on the light head component body, such as a dimmer switch, etc.

In one embodiment, the light head component also comprises a charge port with a cover. The cover is typically attached to the charge port via a strap or other suitable securing means, such that the cover remains attached to the charge port and a user doesn't have to worry about losing the cover when the charge port is in use. The cover protects the charge port from paint and other liquids, when the charge port is not in use. The charge port acts to charge the light head component and typically accepts a USB or other suitable charge cord.

In one embodiment, the second end of the light head component comprises an LED light bank. The LED light bank comprises a plurality of LEDs which shine light and illuminate an area that needs to be painted. Thus, the LED light bank provides visibility when a user is painting the corners and edges of a room. Any suitable lights can be utilized as is known in the art.

In one embodiment, the second end of the light head component comprises a paint shield. The paint shield protects the LED light bank from paint splatters and other spills and accidents. The paint shield typically covers the top half of the perimeter of the LED light bank and extends out, away from the LED light bank, creating a shield and protecting the LED light bank from paint and other liquids.

In one embodiment, the base component of the pivoting neck component comprises a pair of adjustable straps for securing around a paint roller pole. Any suitable number of adjustable straps can be utilized, as is known in the art, depending on the wants and/or needs of a user. Typically, the device comprises two adjustable straps. Specifically, either end of the base component comprises a semi-rigid attachment plate in a curved configuration, such that the attachment plates can wrap around a paint roller pole. Underneath the base component and the attachment plates comprise a gripping or textured material, which helps to secure the pivoting neck component to the paint roller pole and prevent slipping and movement, once attached. The gripping or textured material can be any suitable gripping material as is known in the art. The pair of straps are secured over the semi-rigid attachment plates. The pair of straps can be secured to the semi-rigid attachment plates via any suitable securing means, as is known in the art. The straps also comprise a threaded buckle or Velcro attachment, which allows the straps to be wrapped around the paint roller pole and secured, as needed. Once in place, the straps and gripping material act to prevent the paint roller pole light device from moving and slipping, during use.

In one embodiment, the paint roller pole light device is arranged as a kit. The kit can comprise, among other things, two repositionable light components, two adjustable straps, and a charger. The two repositionable light components allow a user to use one of the light components and simultaneously charge the second light component. The two adjustable straps act to secure the repositionable light component to a paint roller pole for use. The charger allows a user to charge the repositionable light component, as needed. The contents of the kit can be placed in a storage box or other suitable container with a lid for case in transport.

Additionally, the device is made of a lightweight, durable material such as plastic, fiberglass, or the like and manufactured through common extruding and molding processes. Specifically, the device can be manufactured from heat-scalable plastic or polymers, such as polypropylene or acrylonitrile-butadiene-styrene (ABS), or any other suitable material as is known in the art, such as but not limited to, acrylic, polycarbonate, polyethylene, polyethylene terephthalate, polyvinyl chloride, polystyrene, etc. Generally, the paint roller pole light device is also manufactured from a material that is water resistant or waterproof, or the repositionable light component comprises a coating that is water resistant or waterproof. Further, the paint roller pole light device can be made of antibacterial or antimicrobial material or the repositionable light component comprises a coating that is antibacterial or antimicrobial.

In yet another embodiment, the paint roller pole light device comprises a plurality of indicia.

In yet another embodiment, a method of illuminating a painting area without the need for a second individual is disclosed. The method includes the steps of providing a paint roller pole light device comprising a repositionable light component secured to a paint roller pole. The method also comprises inserting a light head component into the repositionable arm or neck component. Further, the method comprises securing the repositionable light component to the paint roller pole via a pair of straps. The method also comprises moving the light head component in the desired position to illuminate the painting area. Finally, the method comprises utilizing the paint roller pole light device to illuminate a painting area while painting.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
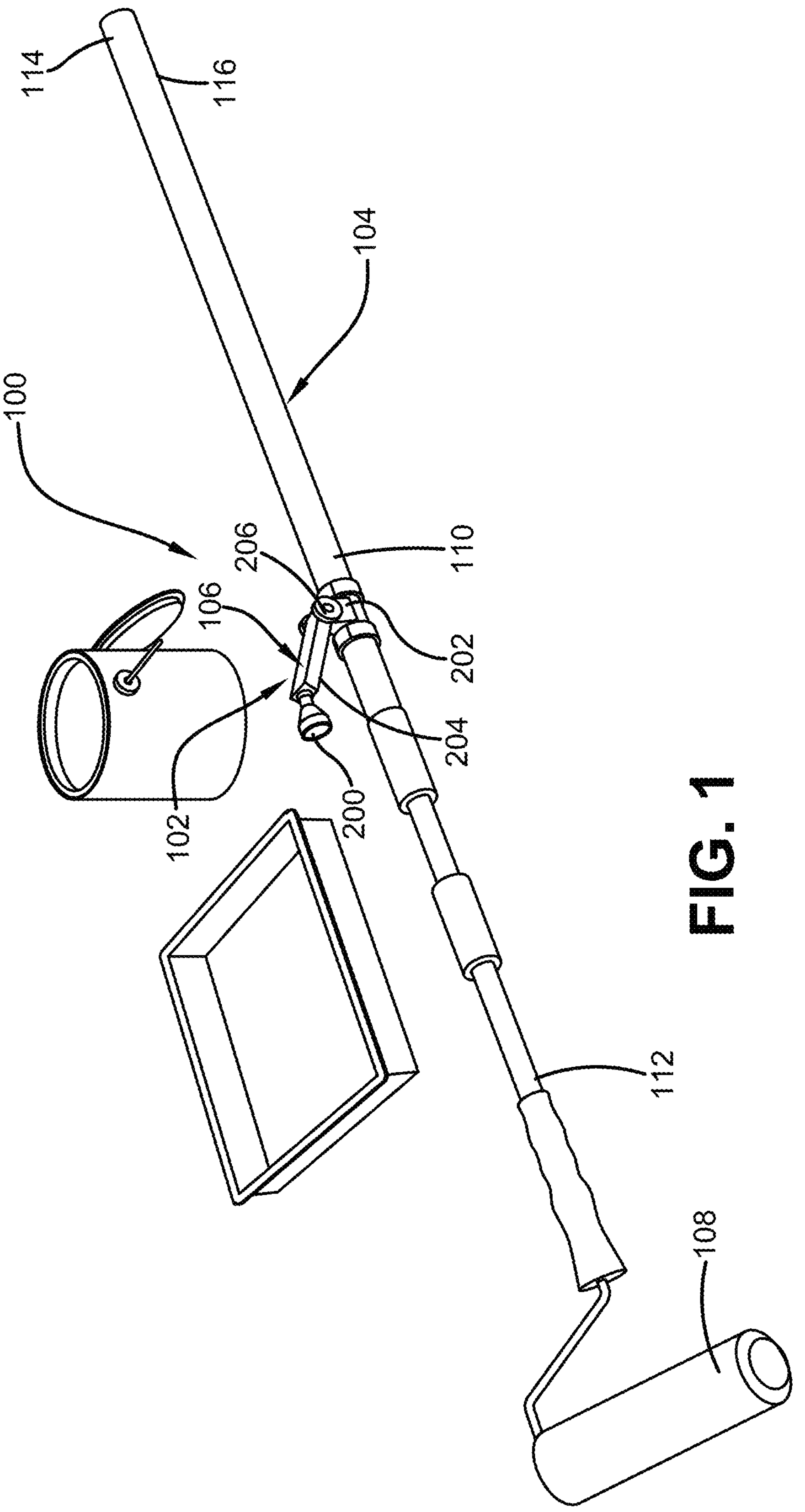
FIG. 1 illustrates a perspective view of one embodiment of the paint roller pole light device of the present invention showing the repositionable light applied to a paint roller pole in accordance with the disclosed architecture.
Figure 2:
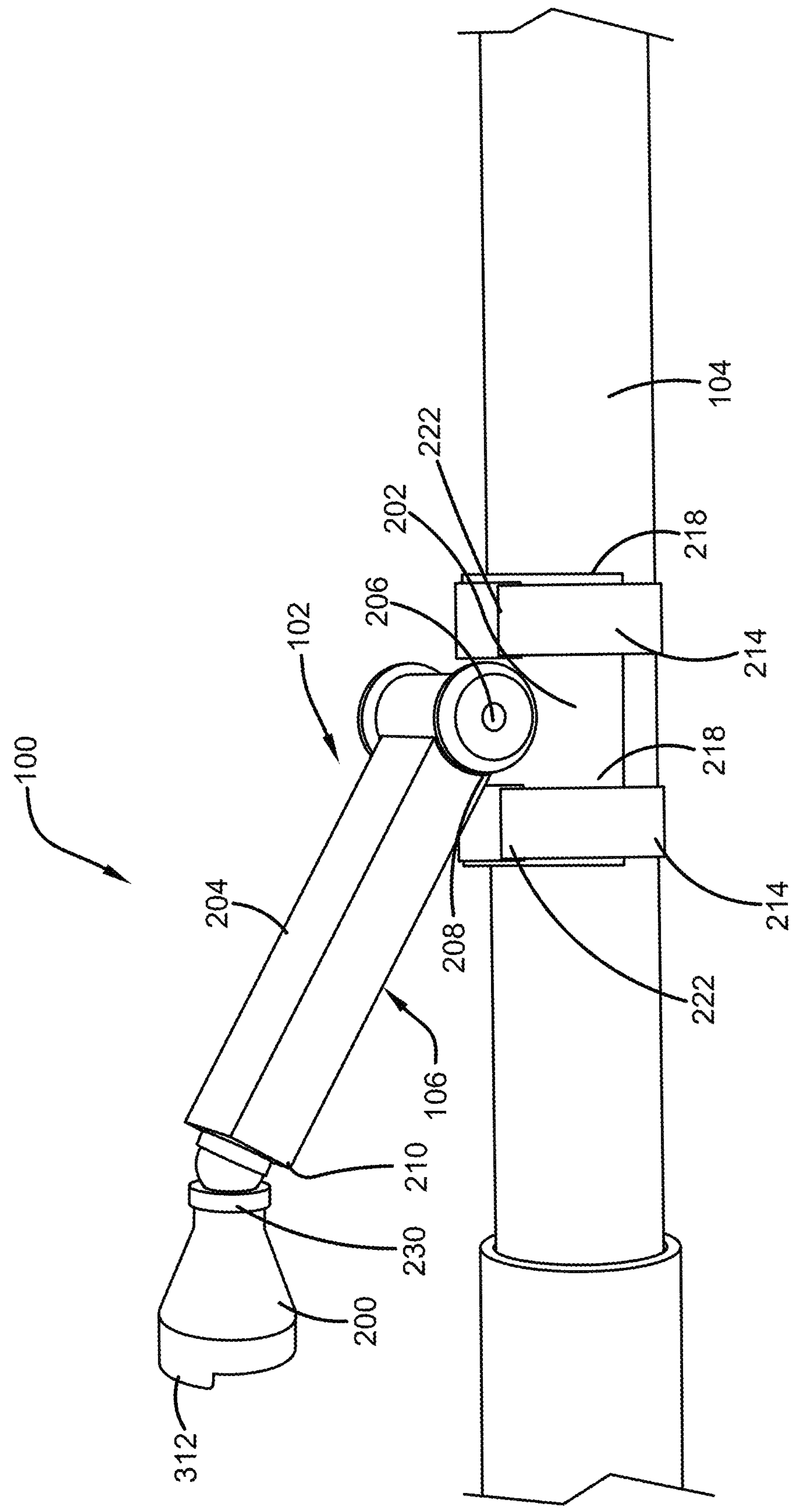
FIG. 2 illustrates a perspective view of one embodiment of the paint roller pole light device of the present invention showing how the light can move in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a paint roller pole light device that provides users with a painting and lighting device. There is also a long felt need in the art for a paint roller pole light device that can be removably attached to a paint roller. Further, there is a long felt need in the art for a paint roller pole light device that illuminates a painting area of the roller without the need for a second individual. Moreover, there is a long felt need in the art for a device that comprises a repositionable light. Further, there is a long felt need in the art for a paint roller pole light device that is repositionable via an omni-directional mount. Finally, there is a long felt need in the art for a paint roller pole light device that is available as a kit.

The present invention, in one exemplary embodiment, is a novel paint roller pole light device. The paint roller pole light device comprises a repositionable light component that is removably attached via straps to a paint roller pole. Specifically, the repositionable light component is attached to a repositionable arm via an omni-directional mount. In this manner, the device illuminates the area directly in front of the paint roller during use. Further, the device is available in a kit comprising two repositionable lights, one for use and one to be charged, with straps to hold the light, and a charger. The present invention also includes a novel method of illuminating a painting area without the need for a second individual. The method includes the steps of providing a paint roller pole light device comprising a repositionable light component secured to a paint roller pole. The method also comprises inserting a light head component into the repositionable arm or neck component. Further, the method comprises securing the repositionable light component to the paint roller pole via a pair of straps. The method also comprises moving the light head component in the desired position to illuminate the painting area. Finally, the method comprises utilizing the paint roller pole light device to illuminate a painting area while painting.

Referring initially to the drawings, FIG. 1 illustrates a perspective view of one embodiment of the paint roller pole light device 100 of the present invention. In the present embodiment, the paint roller pole light device 100 is an improved paint roller pole light device 100 that provides a user with a device for illuminating a painting area without the need for a second individual. Specifically, the paint roller pole light device 100 comprises a repositionable light component 102 secured to a paint roller pole 104. Typically, the repositionable light component 102 is attached to a pivoting arm or neck component 106 via an omni-directional mount. In this manner, the device 100 illuminates the area directly in front of the paint roller 108, during use.

Generally, the paint roller pole light device 100 is an LED attachment for paint roller extension poles 104, designed to make it easier to paint walls and ceilings. For example, painting the corners and edges of a room is a tough job to do right, with visibility as one of the most difficult challenges to overcome. Thus, the paint roller pole light device 100 provides a bright LED light that can be swiveled in multiple directions, and securely strapped to a painter's pole 104. Thus, the device 100 illuminates dark corners and distant surfaces, offering a faster, easier, and neater way to precision paint in any direction.

Typically, the paint roller pole light device 100 is a repositionable light component 102 secured to a paint roller pole 104. Specifically, the light component 102 can be secured to any size paint roller pole 104. The paint roller pole 104 comprises a roller holding rod or pole 110, a paint roller 108 secured at the upper end 112 of the roller holding rod 110, and a handle component 114 secured at the lower end 116 of the roller holding rod 110. The handle component 114 can be any suitable shape and size as is known in the art and can comprise a gripping or textured area 118 for no-slip grip. Further, the length and diameter of the handle component 114 may vary widely, as it is important only that it be reasonably comfortable to hold by hand and allow use of the paint roller 108 with relative case. Accordingly, the paint roller pole light device 100 can be secured to multiple sizes of painter's poles 104.

As shown in FIGS. 2, 3 and 10A-D, the repositionable light component 102 comprises a pivoting neck or arm component 106 with a light head component 200. The pivoting neck or arm component 106 comprises a base component 202 with an extending neck or arm component 204. Further, a ratcheting pin 206 secures the base component 202 to the neck component 204 and allows the neck component 204 to pivot or ratchet up and down. Additionally, the neck component 204 comprises a first end 208 and a second end 210. The first end 208 is secured by the ratcheting pin 206 and the second end 210 comprises a female version of a ball joint 212 to secure the light head component 200. The multiple points and types of articulation allow a user to point the light head component 200 wherever required, as needed.

As shown in FIGS. 2, 6, 8, and 9, the base component 202 of the pivoting neck component 106 comprises a pair of adjustable straps 214 for securing around a paint roller pole 104. Any suitable number of adjustable straps 214 can be utilized, as is known in the art, depending on the wants and/or needs of a user. Typically, the device 100 comprises two adjustable straps 214. Specifically, either end 216 of the base component 202 comprises a semi-rigid attachment plate 218 in a curved configuration, such that the attachment plates 218 can wrap around a paint roller pole 104. Underneath the base component 202 and the attachment plates 218 comprise a gripping or textured material 220, which helps to secure the pivoting neck component 106 to the paint roller pole 104 and prevent slipping and movement, once attached. The gripping or textured material 220 can be any suitable gripping material as is known in the art. The pair of straps 214 are secured over the semi-rigid attachment plates 218. The pair of straps 214 can be secured to the semi-rigid attachment plates 218 via any suitable securing means, as is known in the art. The straps 214 also comprise a threaded buckle or Velcro attachment 222, which allows the straps 214 to be wrapped around the paint roller pole 104 and secured, as needed. Once in place, the straps 214 and gripping material 220 act to prevent the paint roller pole light device 100 from moving and slipping, during use.

Figure 7:
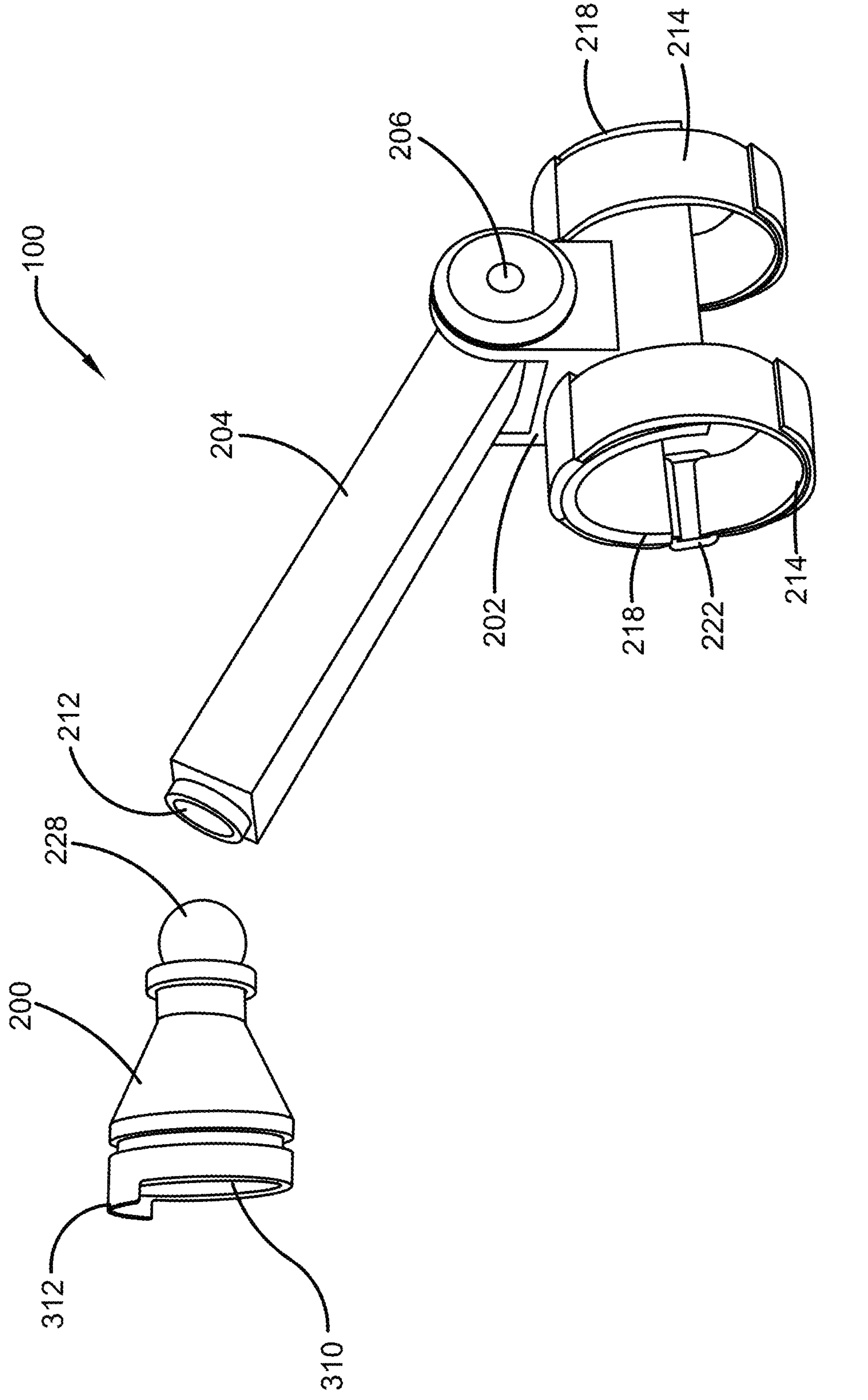
FIG. 7 illustrates a perspective view of one embodiment of the paint roller pole light device of the present invention showing the light head component removed from the pivoting neck component in accordance with the disclosed architecture.
Figure 8:
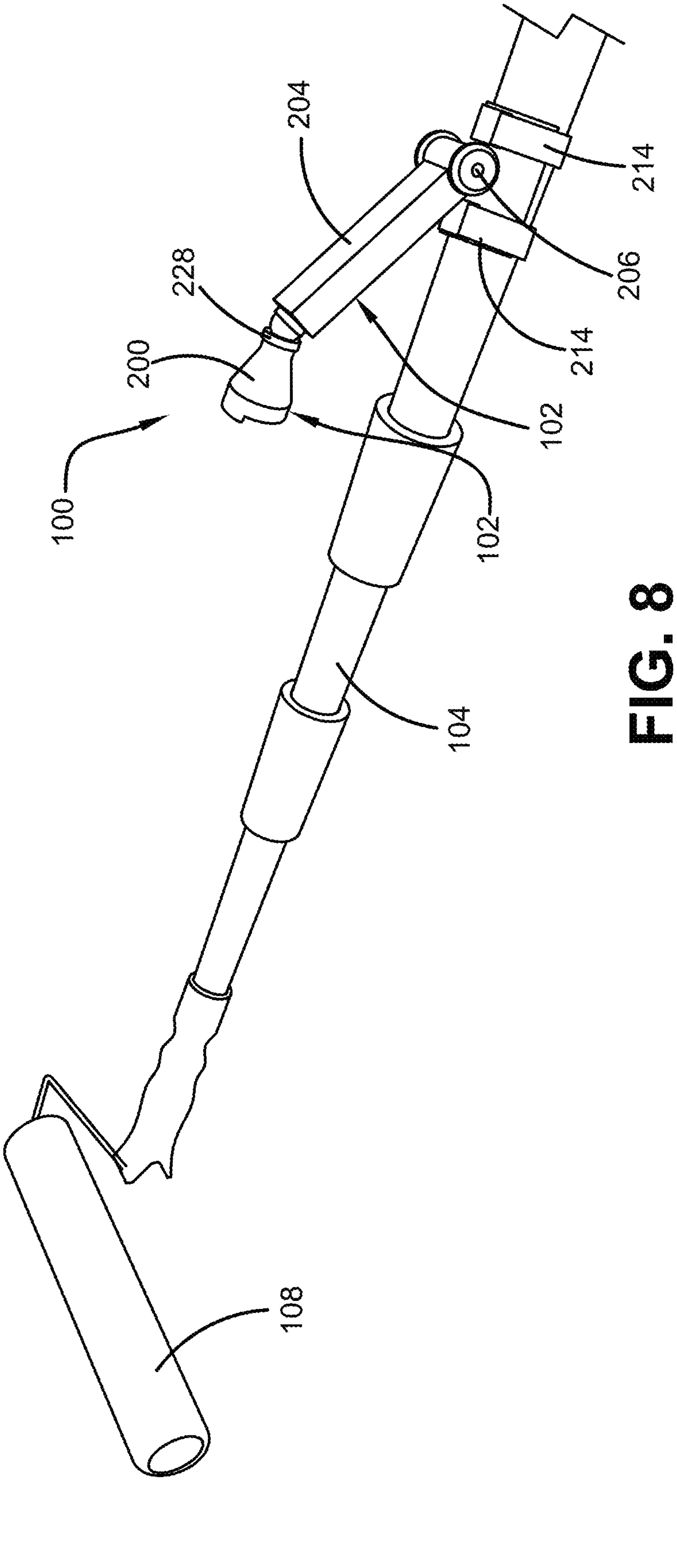
FIG. 8 illustrates a perspective view of one embodiment of the paint roller pole light device of the present invention showing the light component attached to the paint roller pole in accordance with the disclosed architecture.
Figure 9:
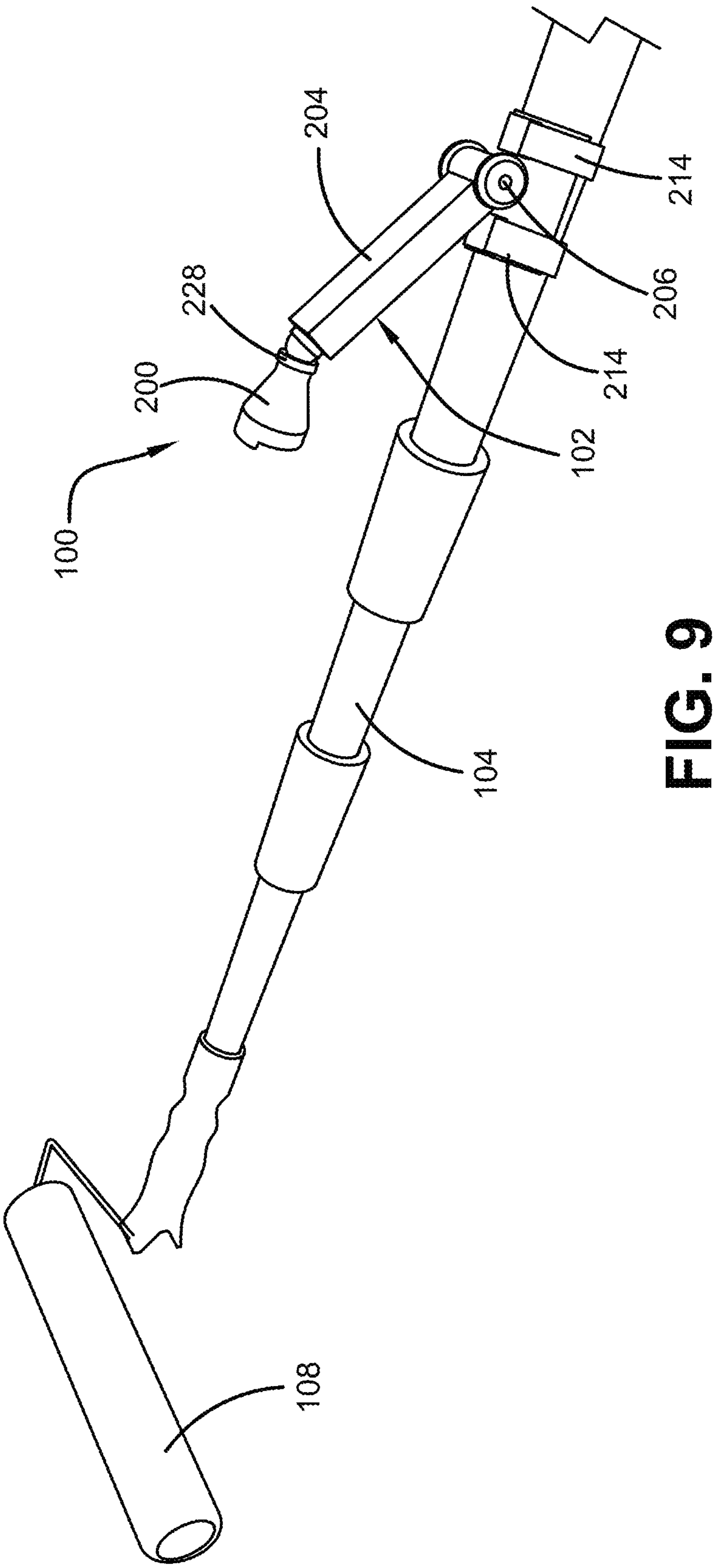
FIG. 9 illustrates a perspective view of one embodiment of the paint roller pole light device of the present invention in use in accordance with the disclosed architecture.
Figures 10A, 10B, 10C, 10D:
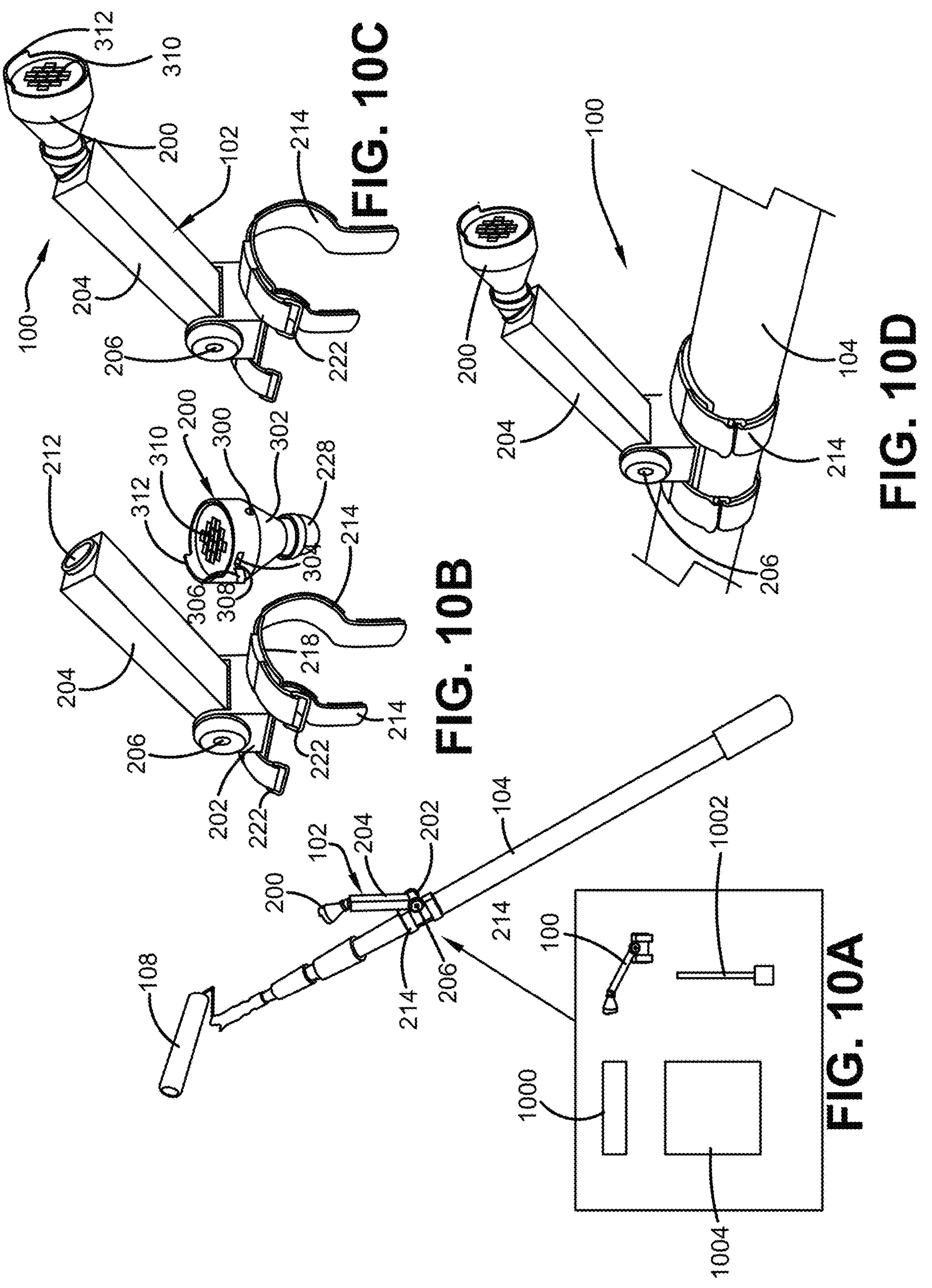
FIG. 10A-D illustrate a perspective view of one embodiment of the paint roller pole light device of the present invention showing the components of the device in accordance with the disclosed architecture.

As shown in FIGS. 7, 8, and 9, the light head component 200 comprises a first end 224 and a second end 226. The first end 224 comprises a male version of a ball joint 228, which secures to the female version of the ball joint 212 on the second end 210 of the neck component 204, allowing the light head component 200 to rotate and move on the neck component 204. Once in place, a tightening nut 230 is used to secure the light head component 200 is place. Specifically, the ball joint 212 and 228 along with the pivoting neck component 106, allows the light head component 200 to be omni-directional and allows a user to position the light head component 200 in any position, as needed to illuminate a specific area. This helps make painting jobs faster, neater, easier, and more precise.

Figure 3:
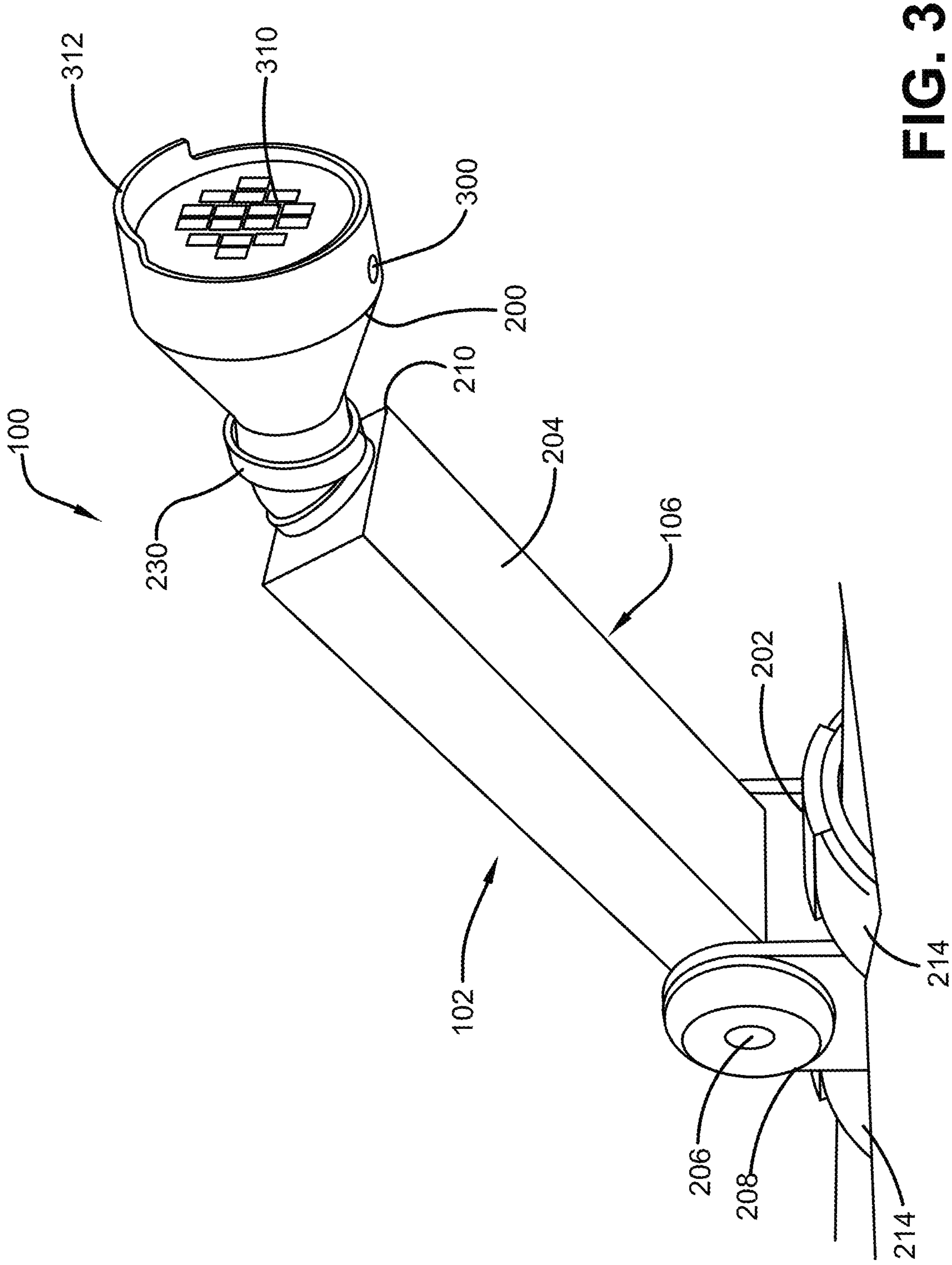
FIG. 3 illustrates a perspective view of one embodiment of the paint roller pole light device of the present invention showing the paint shield on the light component in accordance with the disclosed architecture.
Figure 4:
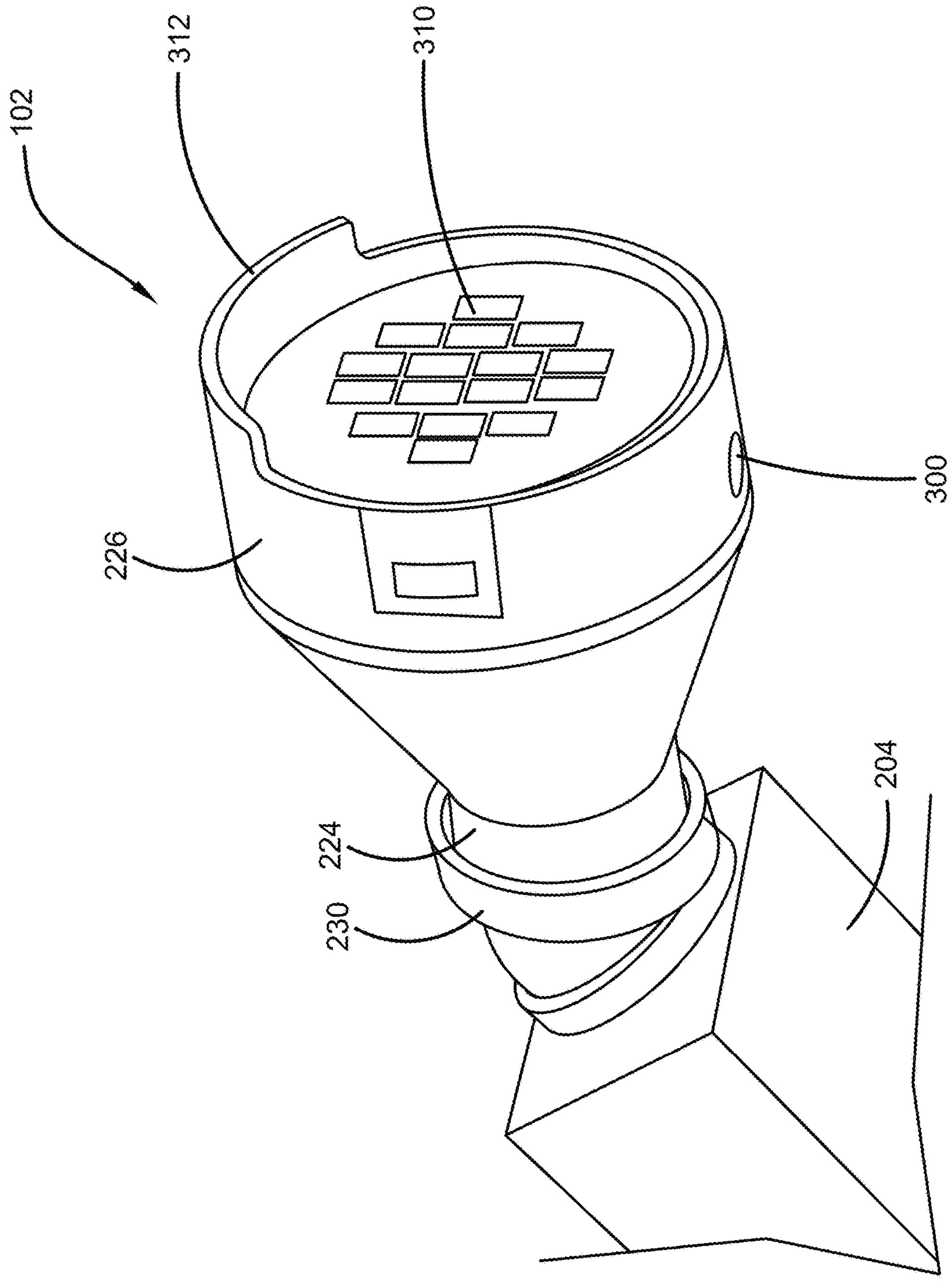
FIG. 4 illustrates a perspective view of one embodiment of the paint roller pole light device of the present invention showing a close-up of the LED light bank in accordance with the disclosed architecture.
Figure 5:
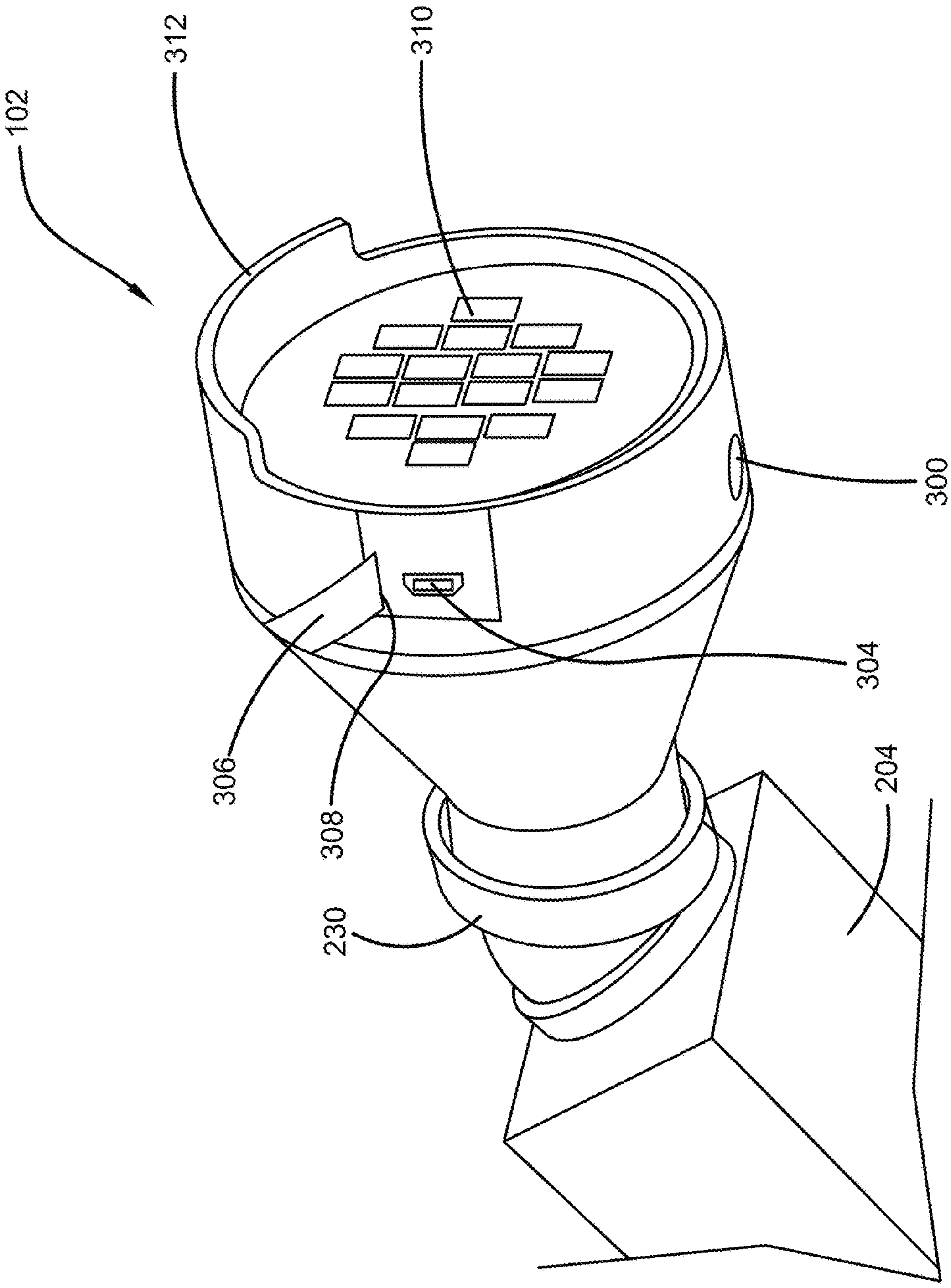
FIG. 5 illustrates a perspective view of one embodiment of the paint roller pole light device of the present invention showing the charge port and cover in accordance with the disclosed architecture.
Figure 6:
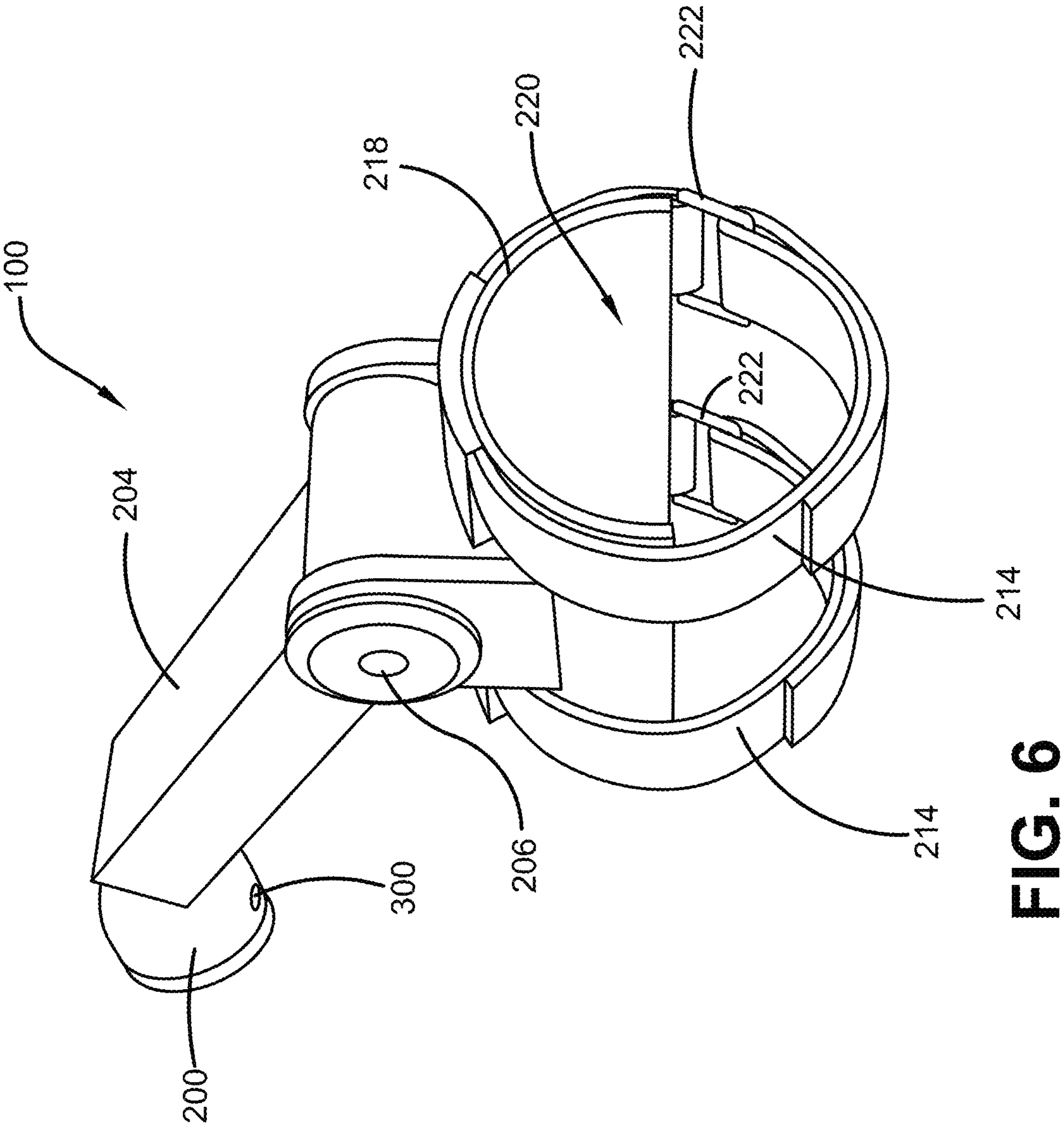
FIG. 6 illustrates a perspective view of one embodiment of the paint roller pole light device of the present invention showing the attachment straps in accordance with the disclosed architecture.

As shown in FIGS. 3-5, the light head component 200 comprises an on/off button 300 on its body 302. The on/off button 300 allows a user to turn on and off the paint roller pole light device 100, as needed. Further, any other suitable controls can be included on the light head component body 302, such as a dimmer switch, etc.

Further, the light head component 200 also comprises a charge port 304 with a cover 306. The cover 306 is typically attached to the charge port 304 via a strap 308 or other suitable securing means, such that the cover 306 remains attached to the charge port 304 and a user doesn't have to worry about losing the cover 306 when the charge port 304 is in use. The cover 306 protects the charge port 304 from paint and other liquids, when the charge port 304 is not in use. The charge port 304 acts to charge the light head component 200 and typically accepts a USB or other suitable charge cord (not shown).

Additionally, the second end 226 of the light head component 200 comprises an LED light bank 310. The LED light bank 310 comprises a plurality of LEDs which shine light and illuminate an area that needs to be painted. Thus, the LED light bank 310 provides visibility when a user is painting the corners and edges of a room. In lieu of LED lights, any suitable lights can be utilized as is known in the art.

Furthermore, the second end 226 of the light head component 200 comprises a paint shield 312. The paint shield 312 protects the LED light bank 310 from paint splatters and other spills and accidents. The paint shield 312 typically covers the top half of the perimeter of the LED light bank 310 and extends out, away from the LED light bank 310, creating a shield and protecting the LED light bank 310 from paint and other liquids.

As shown in FIGS. 10A-D, the paint roller pole light device 100 is arranged as a kit 1000. The kit 1000 can comprise, among other things, two repositionable light components 102, two adjustable straps 214, and a charger 1002. The two repositionable light components 102 allow a user to use one of the light components 102 and simultaneously charge the second light component 102. The two adjustable straps 214 act to secure the repositionable light component 102 to a paint roller pole 104 for use. The charger 1002 allows a user to charge the repositionable light component 102, as needed. The contents of the kit 1000 can be placed in a storage box or other suitable container 1004 with a lid 1006 for case in transport.

Figure 11A:
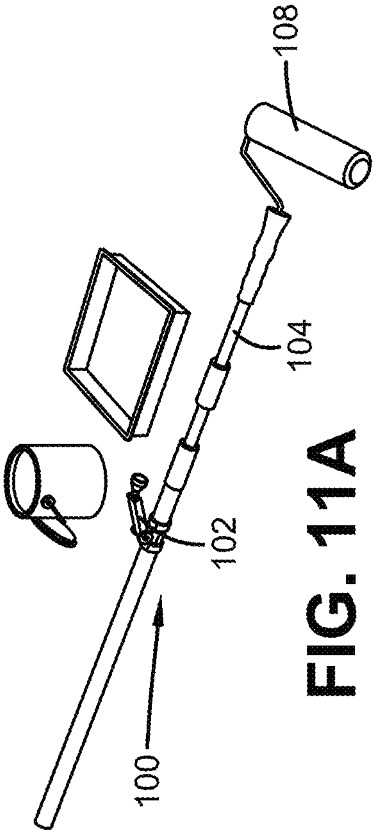
FIGS. 11A-C illustrate a perspective view of one embodiment of the paint roller pole light device of the present invention showing the device in use in accordance with the disclosed architecture.
Figure 11B:
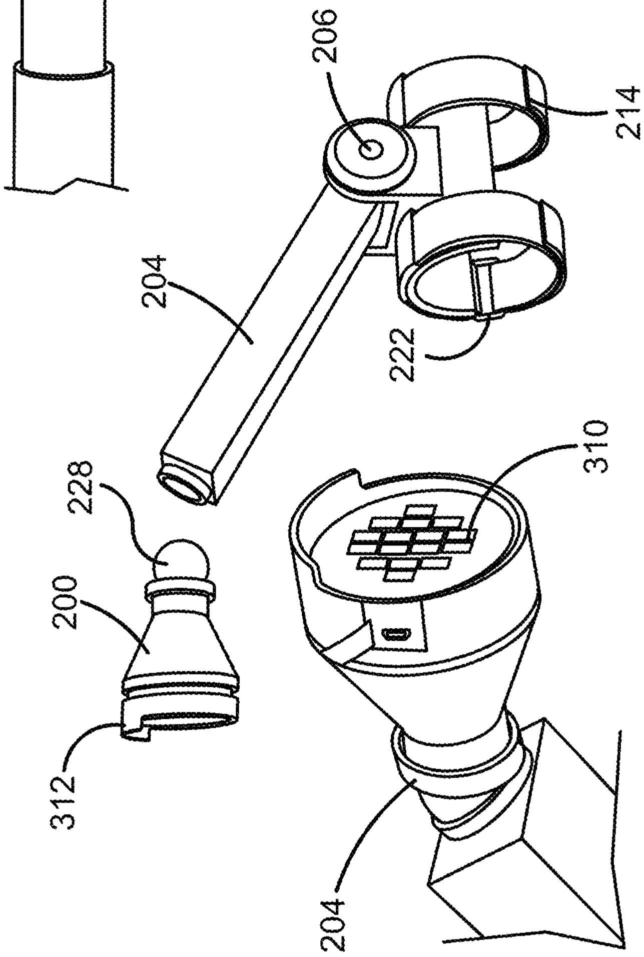
Figure 11C:
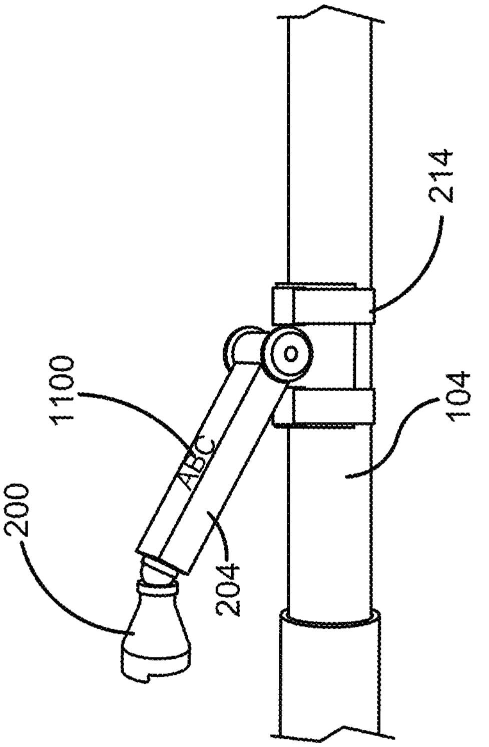

As shown in FIGS. 11A-C, the device 100 is made of a lightweight, durable material such as plastic, fiberglass, or the like and manufactured through common extruding and molding processes. Specifically, the device 100 can be manufactured from heat-scalable plastic or polymers, such as polypropylene or acrylonitrile-butadiene-styrene (ABS), or any other suitable material as is known in the art, such as but not limited to, acrylic, polycarbonate, polyethylene, polyethylene terephthalate, polyvinyl chloride, polystyrene, etc. Generally, the paint roller pole light device 100 is also manufactured from a material that is water resistant or waterproof, or the repositionable light component 102 comprises a coating that is water resistant or waterproof. Further, the paint roller pole light device 100 can be made of antibacterial or antimicrobial material or the repositionable light component 102 comprises a coating that is antibacterial or antimicrobial.

In yet another embodiment, the paint roller pole light device 100 comprises a plurality of indicia 1100. The repositionable light component 102 of the device 100 may include advertising, a trademark, or other letters, designs, or characters, printed, painted, stamped, or integrated into the repositionable light component 102, or any other indicia 1100 as is known in the art. Specifically, any suitable indicia 1100 as is known in the art can be included, such as but not limited to, patterns, logos, emblems, images, symbols, designs, letters, words, characters, animals, advertisements, brands, etc., that may or may not be paint, paint roller, or brand related.

Figure 12:
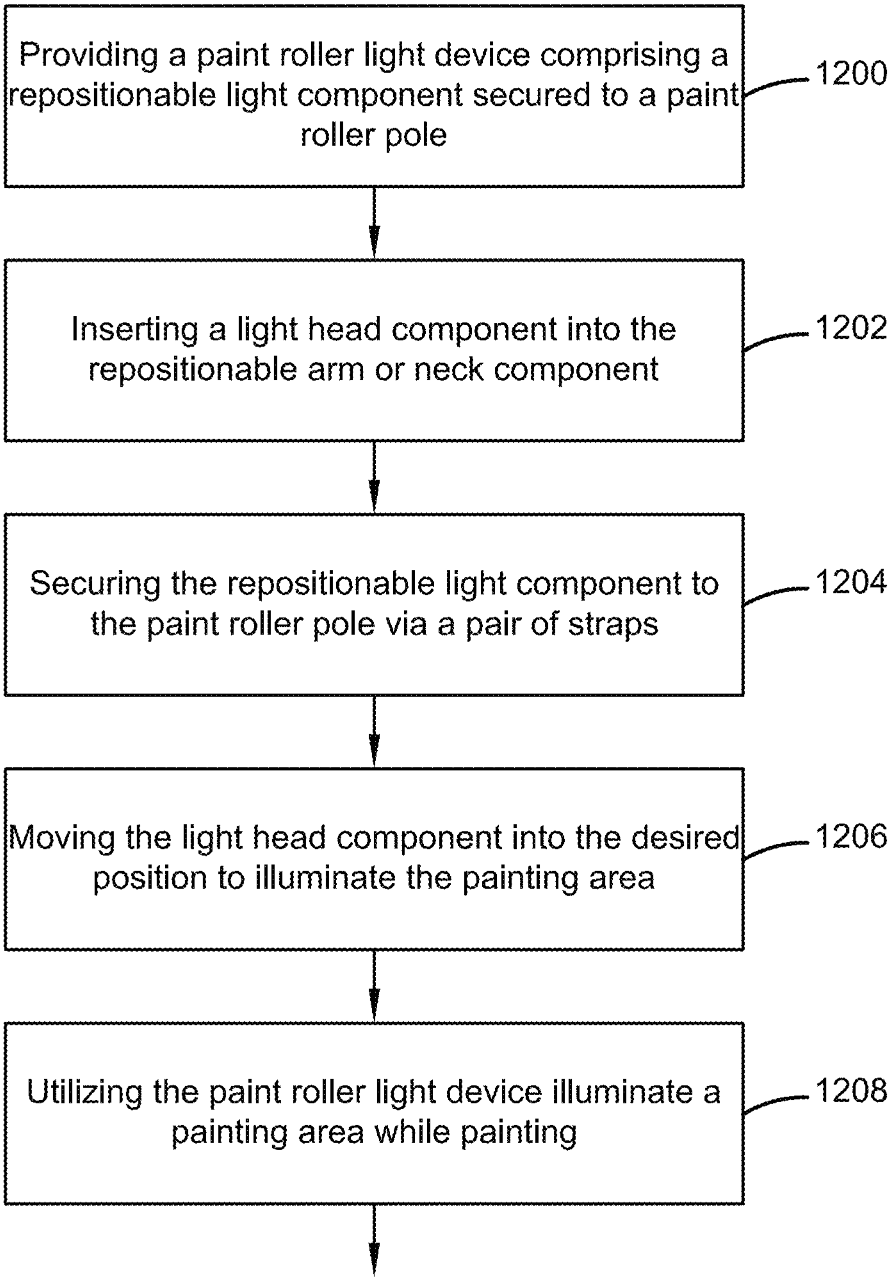
FIG. 12 illustrates a flowchart showing the method of illuminating a painting area without the need for a second individual in accordance with the disclosed architecture.

FIG. 12 illustrates a flowchart of the method of illuminating a painting area without the need for a second individual. The method includes the steps of at 1200, providing a paint roller pole light device comprising a repositionable light component secured to a paint roller pole. The method also comprises at 1202, inserting a light head component into the repositionable arm or neck component. Further, the method comprises at 1204, securing the repositionable light component to the paint roller pole via a pair of straps. The method also comprises at 1206, moving the light head component in the desired position to illuminate the painting area. Finally, the method comprises at 1208, utilizing the paint roller pole light device to illuminate a painting area while painting.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "paint roller pole light device", "paint roller pole device", "pole light device", and "device" are interchangeable and refer to the paint roller pole light device 100 of the present invention.

Notwithstanding the forgoing, the paint roller pole light device 100 of the present invention can be of any suitable size and configuration as is known in the art without affecting the overall concept of the invention, provided that it accomplishes the above stated objectives. One of ordinary skill in the art will appreciate that the paint roller pole light device 100 as shown in FIGS. 1-12 is for illustrative purposes only, and that many other sizes and shapes of the paint roller pole light device 100 are well within the scope of the present disclosure. Although the dimensions of the paint roller pole light device 100 are important design parameters for user convenience, the paint roller pole light device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A paint roller pole light device that provides a user with a device for illuminating a painting area without the need for a second individual, the paint roller pole light device comprising:

a repositionable light component comprising a pivoting neck component with a light head component, wherein the pivoting neck component comprises a base component with an extending neck component, secured by a ratcheting pin, which allows the extending neck component to pivot or ratchet up and down; and a paint roller pole comprising a roller holding rod, a paint roller secured at an upper end of the roller holding rod, and a handle component secured at a lower end of the roller holding rod;

wherein the repositionable light component is secured to the paint roller pole; and further wherein the repositionable light component illuminates an area directly in front of the paint roller pole, during use, making it easier to paint corners and edges of a room.

2. The paint roller pole light device of claim 1, wherein the extending neck component comprises a first end and a second end, with the first end secured by the ratcheting pin and the second end comprises a female ball joint which secures to the light head component.

3. The paint roller pole light device of claim 2, wherein the base component comprises a pair of adjustable straps for securing around the paint roller pole.

4. The paint roller pole light device of claim 3, wherein each end of the base component comprises a semi-rigid attachment plate in a curved configuration, such that the semi-rigid attachment plates can wrap around the paint roller pole.

5. The paint roller pole light device of claim 4, wherein underneath the base component and the semi-rigid attachment plates comprise a gripping material to prevent movement of the base component.

6. The paint roller pole light device of claim 5, wherein the pair of adjustable straps are secured over the semi-rigid attachment plates and secured over the paint roller pole via Velcro.

7. The paint roller pole light device of claim 6, wherein the light head component comprises a first end and a second end, with the first end comprising a male ball joint, which secures to the female ball joint on the second end of the extending neck component, allowing the light head component to rotate and move on the extending neck component.

8. The paint roller pole light device of claim 7, wherein the light head component comprises an on/off button.

9. The paint roller pole light device of claim 8, wherein the light head component comprises a charge port with an attached cover.

10. The paint roller pole light device of claim 9, wherein the second end of the light head component comprises an LED light bank.

11. The paint roller pole light device of claim 10, wherein the second end of the light head component comprises a paint shield.

12. A paint roller pole light device that provides a user with a device for illuminating a painting area without the need for a second individual, the paint roller pole light device comprising:

a repositionable light component comprising a pivoting neck component with a light head component; and a paint roller pole;

wherein the repositionable light component is secured to the paint roller pole;

wherein the pivoting neck component comprises a base component with an extending neck component, secured by a ratcheting pin, which allows the extending neck component to pivot or ratchet up and down;

wherein the extending neck component comprises a first end and a second end, with the first end secured by the ratcheting pin and the second end comprises a female ball joint which secures to the light head component;

wherein each end of the base component comprises a semi-rigid attachment plate in a curved configuration, such that the semi-rigid attachment plates can wrap around the paint roller pole;

wherein the base component comprises a pair of adjustable straps for securing around the paint roller pole, which are secured over the semi-rigid attachment plates and secured over the paint roller pole via Velcro;

wherein the light head component comprises a first end and a second end, with the first end comprising a male ball joint, which secures to the female ball joint on the second end of the extending neck component, allowing the light head component to rotate and move on the extending neck component;

wherein the second end of the light head component comprises an LED light bank and a paint shield; and further wherein the repositionable light component illuminates an area directly in front of the paint roller pole, during use, making it easier to paint corners and edges of a room.

13. The paint roller pole light device of claim 12, wherein the light head component comprises an on/off button.

14. The paint roller pole light device of claim 12, wherein the light head component comprises a charge port with an attached cover.

15. The paint roller pole light device of claim 12, wherein the paint roller pole light device is arranged as a kit.

16. The paint roller pole light device of claim 12 further comprising a plurality of indicia.

17. A method of illuminating a painting area without the need for a second individual, the method comprising the following steps:

providing a paint roller pole light device comprising a repositionable light component secured to a paint roller pole;

inserting a light head component into the repositionable arm or neck component;

securing the repositionable light component to the paint roller pole via a pair of straps;

moving the light head component in the desired position to illuminate the painting area; and utilizing the paint roller pole light device to illuminate a painting area while painting.

* * * * *